Feb. 16, 1960 — A. C. HIRSCHLE — 2,925,292
POSITIONING AND LOCKING DEVICE
Filed Oct. 2, 1958
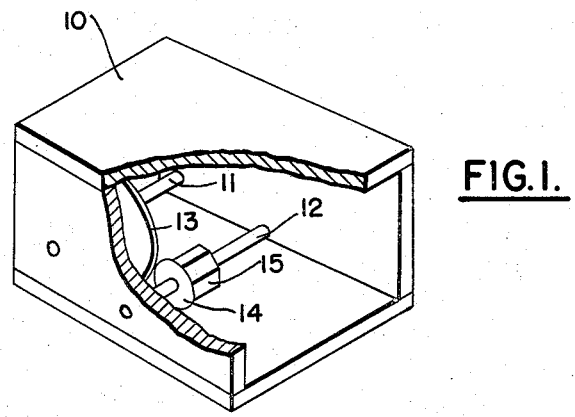
FIG. 1.
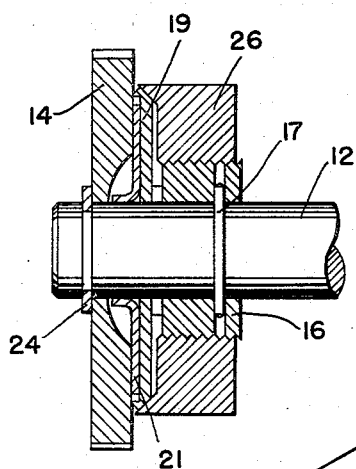
FIG. 2.
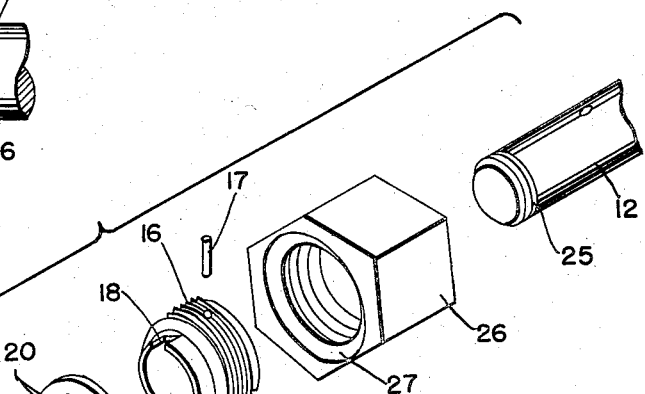
FIG. 3.
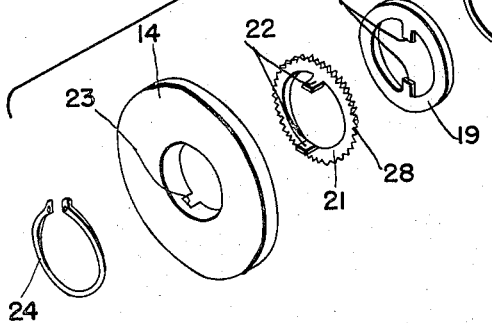
*INVENTOR.*
ALFRED C. HIRSCHLE
BY *W. E. Thibodeau,*
*A. D. Dupont & H. R. Johns*
ATTORNEYS:

United States Patent Office 2,925,292
Patented Feb. 16, 1960

2,925,292

POSITIONING AND LOCKING DEVICE

Alfred C. Hirschle, Wayne, Pa., assignor to the United States of America as represented by the Secretary of the Army Application October 2, 1958, Serial No. 765,006

2 Claims. (Cl. 287—52)

(Granted under Title 35, U.S. Code (1952), sec. 266)

The invention described herein may be manufactured and used by or for the Government for governmental purposes without the payment of any royalty thereon.

This invention relates to locking devices, and more particularly to an improved locking device which is operable within a very restricted space to lock a gear, or other rotatable member, to a shaft in any angular position about its rotational axis.

In the manufacture of some kinds of apparatus, it is required that a gear, a coupling or the like located in a restricted space be (1) adjusted to any one of a number angular positions about a shaft and (2) locked in the selected position. This is not possible with the locking devices heretofore available for the reason that they are operable only from one side of the shaft and may be inaccessible in certain angular positions of the shaft. In accordance with the present invention, this difficulty is avoided by the provision of a locking device which may be operated in any angular position of the shaft.

The invention will be better understood from the following description when considered in connection with the accompanying drawings and its scope is indicated by the appended claims.

Referring to the drawings:

Fig. 1 illustrates one of the many situations to which the present invention is applicable, Fig. 2 illustrates the device as locking a gear to a shaft, and Fig. 3 is an exploded view of the device shown in Fig. 2.

Fig. 1 illustrates a box 10 which is open only at its front side and encloses shafts 11 and 12 on which are mounted cooperating gears 13 and 14. If it is required that the gear 14 be adjusted angularly about the shaft 12, it is apparent that the operating member of its lock may be facing the closed side of the box and can be manipulated only with great difficulty or not at all, depending on the type of the operating member. The present invention provides a locking device 15 which, as hereinafter explained, is operable, from one side of the shaft 12 and in a plane perpendicular to it, to lock the gear 14 to the shaft 12 and to release it therefrom in any angular position of the shaft.

As indicated by Figs. 2 and 3, the locking device includes a hub 16 which is fixed to the shaft 12 by a pin 17, is threaded at its perimeter and has slots 18 at one of its ends. Fitting on the end of the hub 16 is a deformable pressure ring 19 which has tongues 20 extending into the slots 18 of the hub for holding said ring against rotation with respect to said shaft 12. Engaging the pressure ring 19 is a lock ring 21 having tongues 22 which fit into recesses 23 of the gear 14 for holding this ring against rotation with respect to this gear. To the left of the gear 14 is a snap ring or stop 24 which fits into a groove 25 of the shaft 12. The operating element of the device is a nut 26 which is threaded onto the hub 16.

With the nut 26 loose on the hub 16, the gear 14 can be placed in any desired rotative position on the shaft 12. This permits the gear 14 to be meshed with the gear 13 (Fig. 1) which is fixed to the shaft 11. When the gear 14 is properly positioned, the nut 26 is tightened on the hub 16. As this nut is tightened, some of the pressure ring 19, which is of comparatively soft material, is caused to flow or is forced by a chamber 27 on the nut 26 into serrations or recesses 28 of the lock ring 21. This locks the gear 14 to the shaft 12.

Thus the locking device 15 can be loosened or tightened by an end wrench regardless of the rotative position of the shaft, the wrench can be swung in a plane perpendicular to the shaft, and the device may be tightened or loosened even though the movement of the wrench is restricted to a small angle with reference to the axis of the shaft. The projections or tongues 22 engaging recesses 23 together with tongues 20 engaging recesses or slots 18, may each be considered to be a projection and recess type connection preventing relative rotation of their parts.

I claim:

1. In a device for locking a shaft to a rotatable member, said member having at least one recess on a first face, a stop on said shaft abutting a second face of said member, a threaded hub fixed to said shaft on the opposite side of said shaft and said member from said stop, said hub having at least one recess on the side facing said member, a serrated lock ring on said shaft between said member and said hub, said serrated lock ring having a tongue extending into a recess of said member, a deformable pressure ring on said shaft between said serrated locking ring and said hub, said deformable pressure ring having a tongue extending into a recess of said hub, and a nut threaded on said hub, whereby upon tightening said nut said pressure ring is deformed by said nut into the serrations of said lock ring, thus simultaneously engaging said hub and said member and thereby locking said shaft to said member.

2. A device for locking a shaft to a member rotatable with said shaft, a stop on said shaft abutting one side of said member, a threaded hub on said shaft on the opposite side from said stop, a nut threaded on said hub, and a locking means interposed between said hub and said member for simultaneously engaging said hub and said member, whereby on tightening said nut on said hub, said locking means simultaneously engages said hub and said member and thus locks said shaft to said member, said locking means including a lock ring on said shaft fixed against rotation with respect to said member by a projection and recess type connection between said lock ring and member, said lock ring being provided with recesses accessible from at least one of the periphery and a side face thereof, a deformable pressure ring on said shaft fixed against rotation with respect to said hub by a projection and recess type connection, and an inwardly bevelled pressure chamber wall portion on said nut for pressing some of said deformable pressure ring into at least some of said recesses in said lock ring.

References Cited in the file of this patent

UNITED STATES PATENTS

| | | |
|---|---|---|
| 215,080 | True | May 6, 1879 |
| 872,883 | Adams | Dec. 3, 1907 |
| 1,891,405 | Ericksson | Dec. 20, 1932 |